S. R. COPPINS.
HUB BEARING.
APPLICATION FILED MAY 26, 1911.
1,035,421. Patented Aug. 13, 1912.
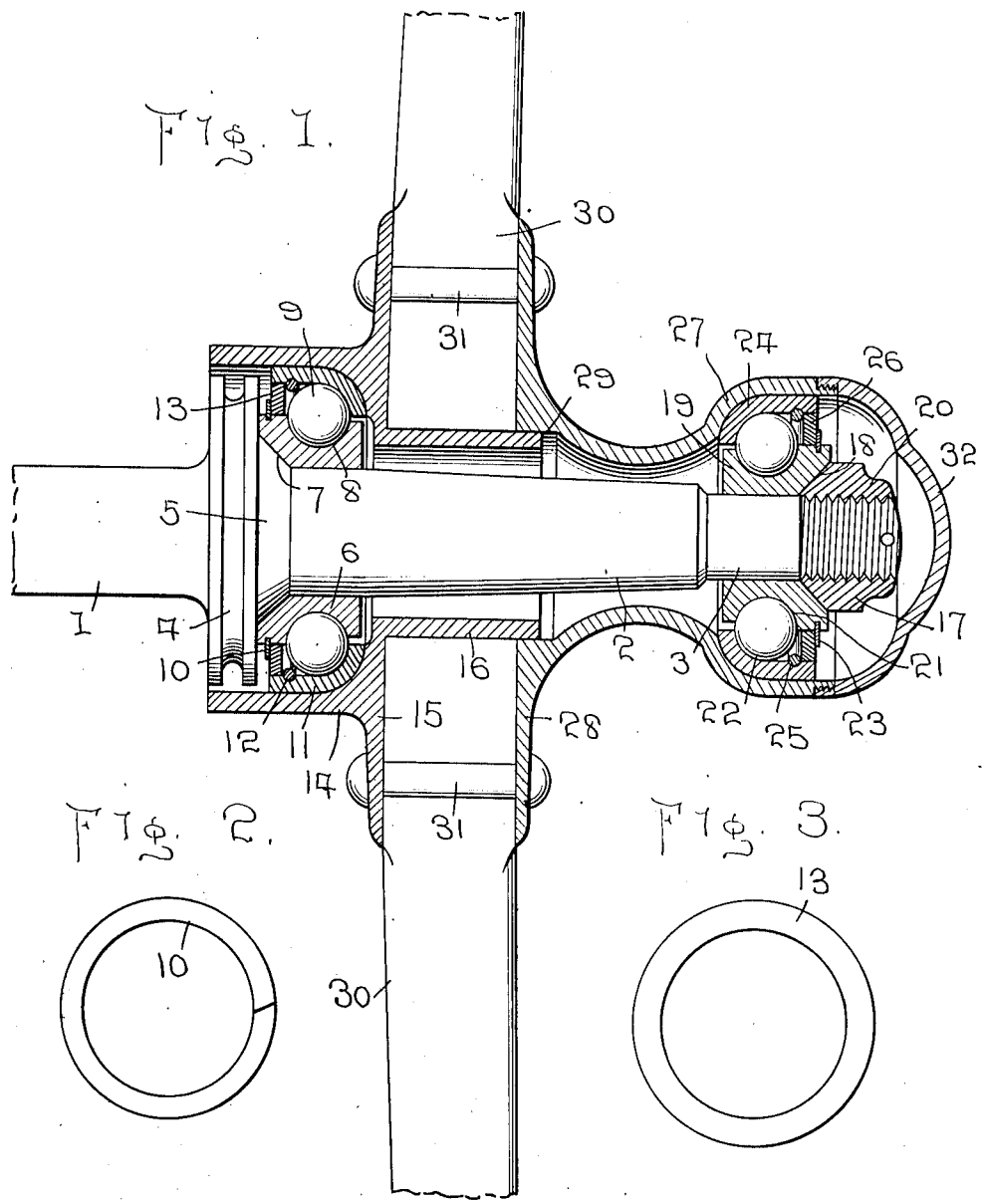
WITNESSES:
INVENTOR
S. R. Coppins
BY
W. J. FitzGerald
Attorneys

UNITED STATES PATENT OFFICE.

SCOTT R. COPPINS, OF PRINCETON, ILLINOIS, ASSIGNOR OF ONE-HALF TO SAM S. EVANS, OF PRINCETON, ILLINOIS.

HUB-BEARING.

1,035,421.  Specification of Letters Patent.  Patented Aug. 13, 1912.

Application filed May 26, 1911. Serial No. 629,698.

*To all whom it may concern:*

Be it known that I, SCOTT R. COPPINS, a citizen of the United States, residing at Princeton, in the county of Bureau and State of Illinois, have invented certain new and useful Improvements in Hub-Bearings; and I do hereby declare the following to be a full, clear, and exact description of the invention, such as will enable others skilled in the art to which it appertains to make and use the same.

This invention relates to hubs and more particularly to hub construction for automobiles, carriages, and like vehicles.

An object of the invention is to construct a hub, or wheel bearing, which will be strong and durable enough to withstand the crushing strain and wear to which it is subjected and to have a life at least equal to the life of the ordinary vehicle.

Another object is to provide a hub or wheel bearing, of the above stated nature, which may be applied to axles and spindles of various conveyances without requiring said hubs to be absolutely exact in all dimensions.

Another object is to devise a hub, which acts as the bearing housing as well as the hub of the wheel.

Another object is to provide a hub and wheel bearing construction of the above stated character, which will be easy to manufacture, on account of its shape, and which will not stick or catch, but will fit snugly enough to prevent rattling of the parts, and, another object is to provide a construction of this type having ball bearings and means for preventing dirt or dust from coming in contact with said bearings.

Other objects and advantages will be hereinafter set forth and pointed out in the specification and claim.

In the accompanying drawings which are made a part of this application, Figure 1 is a sectional view through the entire device, showing the spokes secured in the housing, which also constitutes the hub. Fig. 2 is a detail view of the spring for holding the felt washer in position, and, Fig. 3 is a detail view of the washer.

Referring to the drawings in which similar reference numerals designate corresponding parts throughout the several views, 1 represents the axle having the tapering spindle 2 and the reduced threaded end 3, a suitable flange 4 being provided at the junction of the spindle 2 and the axle 1, said spindle having a beveled portion 5 joining with the flange 4, said beveled portion being at an angle to said spindle and said flange.

Secured upon the inner end of the spindle 2 is the collar 6, which has a beveled edge 7 for engagement against the beveled portion 5 of the inner end of said spindle. In the outer surface or periphery of the collar 6 is the ball bearing channel or groove 8, within which are positioned suitable bearing balls 9. Secured in a suitable groove in the periphery of the collar 6, near the flange 4, is a suitable felt washer-retaining spring 10, the purpose of which will presently be described.

Positioned around the collar 6 and resting upon the bearing balls 9 and partly surrounding the latter, is the cup 11, which carries the retaining wire or spring 12 embedded in the inner surface thereof, adjacent its straight edge, which retains the cup in proper position in relation to the collar and also retains the bearing balls 9 within the channel 8. Positioned between the retaining wire 12 and the spring 10, is the felt washer 13, which is held in position by the spring 10, previously mentioned. This felt washer prevents dirt and dust from reaching the bearing balls 9 and interfering with the latter or injuring them. Positioned outwardly of the cup 11 and the flange 4 is the inner half 14 of the bearing ball housing. Integral with this half 14 of the housing is the flange 15, extending at right angles thereto and the circular spindle surrounding portion 16, which is at right angles to the flange 15 and revolves around the spindle 2, the portion 16 projecting oppositely to the main part of the half 14.

Secured upon the outer threaded end 3 of the spindle is the axle nut 17, which may be held in position by a cotter pin, or other nut locking means. This nut 17 is provided with a beveled portion 18, opposite the beveled portion 5 of the spindle, said beveled portion 18 being at about the same angle as the spindle bevel 5, but in a direction opposite to the bevel 5. Fitting upon the smooth portion of the reduced end 3 of the spindle 2, is a collar 19, similar to the collar 6, said collar having a beveled face 20 similar to the beveled face 7 of the collar 6. The beveled face 20 of the collar 19 engages against the beveled portion 18 of the nut 17. The collar 19 is also provided with a ball bearing channel 21 in its periphery to accommodate the bearing balls 22, positioned therein.

Secured in the periphery of the collar 19, is a washer retaining spring 23, identical with the retaining spring 10, carried by the collar 6. Positioned upon the bearing 22, and partly surrounding the latter, is the cup 24, similar to the cup 11 and performing a like purpose. This cup 24 carries the wire 25 in its inner face and outwardly of the bearing balls 22, to prevent the bearing balls 22 from slipping out of the channel 21.

Positioned between the wire 25 and the retaining spring 23, is the felt washer 26, which, like the washer 13, prevents dirt and dust from making their way to the adjacent bearing balls. This washer is held in position by the wire 25 at one side and the spring 23 at its opposite side.

Surrounding the cup 24 is the outer half 27 of the housing, which conforms to the shape of the cups and prevents the parts from moving longitudinally upon the spindle. The half 27 of the housing is provided with a right angled flange 28, parallel with the flange 15 of the half 14, the half 27 having the straight circular portion 29, which is adapted to engage upon the outer face of the spindle surrounding portion or sleeve 16. The spokes 30 of the wheel have their inner tenoned ends positioned between the flanges 15 and 28, and bolts or rivets 31 are passed therethrough to hold the spokes in proper position, and at the same time hold the flanges 15 and 28 against the opposite sides of said spokes, the ends of the spokes resting against the sleeve 16 of the first half 14 of the housing. Thus it will be seen that the housing also forms the hub, a separate and distinct hub being entirely unnecessary.

The outer circular end of the half 27 of the housing is provided with threads to receive the screw threaded cap 32, which fits over the nut 17, and protects the end of the spindle and the bearing balls, etc. carried thereupon, from the dirt and dust. This cap 32 is of sufficient size to leave a space between the nut 17 and the outer end of the spindle and said cap to prevent these parts from coming into engagement with the cap and thus interfering with the operation of said parts.

Owing to the construction of the bearing, bearing housing and hub construction combined, they may be employed upon vehicles of various types without increasing the expense of the same, but on the other hand will tend to decrease the cost of the manufacture of such conveyances, for the reason that the bearing housing also serves as the hub of the wheel, and as the axle and spindle do not have to be manufactured with the care heretofore necessary to insure, all of the parts being of the proper dimensions. Further, this bearing and housing may be applied to axles and spindles of various diameters and dimensions with equally as good results and the expense of manufacturing will be greatly decreased. This construction will be highly efficient and durable and will outlast any vehicle. The cost of repairing the spindles and hub and replacing them with new ones, will also be entirely eliminated. The bearing balls used in this device will also last indefinitely, as they are protected by the formation of the surrounding parts and the felt washer, which exclude all dust and dirt, which latter is well known as an enemy of bearings of various kinds, interfering with the operation of the bearings and wearing away the surfaces thereof, also absorbing all of the grease and moisture from the bearings and causing them to become dry and rust. It may be stated that the main reason why the cost of manufacturing will be less is due to the fact that absolute close fitting of axle at collar bearing is cared for by the bevel of collar and axle at collar end and insured by nut and collar at threaded end of spindle. A loose fit can be made at said points and will be kept from rattling by the beveled sections.

What I claim is:

The combination with a spindle and a bearing housing thereover, of collars positioned upon the opposite ends of the spindle, the inner end of said spindle being beveled to receive one of the collars thereagainst, said collars having semi-circular channels in the periphery thereof, a nut having a beveled face and adjustably secured upon the outer end of the spindle to receive the other collar thereagainst, cups around said collars, bearing balls within the channels in the periphery of said collars, said cups resting upon said bearing balls, means carried by said cups for preventing the bearing balls from sliding out of said channels and also for locking cups in position around said collars, felt washers positioned between said collars and said cups, means carried by said collars to co-act with the means carried by said cups to hold said felt washers in proper position to prevent foreign matter from reaching the bearing balls, said housing being positioned around said spindle and frictionally engaged against the outer surfaces of said cups, and means at the outer end of said spindle for closing the housing outwardly of the outer end of the spindle to prevent the entrance of dust or other foreign matter.

In testimony whereof I have signed my name to this specification in the presence of two subscribing witnesses.

SCOTT R. COPPINS.

Witnesses:
 SAML. W. COCKRELL,
 W. T. FITZ GERALD.